(12) United States Patent
Donderici

(10) Patent No.: US 11,904,905 B2
(45) Date of Patent: Feb. 20, 2024

(54) DYNAMIC ADJUSTMENT OF AUTONOMOUS VEHICLE SYSTEM BASED ON DEEP LEARNING OPTIMIZATIONS

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 222 days.

(21) Appl. No.: 17/589,147

(22) Filed: Jan. 31, 2022

(65) Prior Publication Data
US 2023/0242157 A1    Aug. 3, 2023

(51) Int. Cl.
*B60W 60/00* (2020.01)
*G05B 13/04* (2006.01)
*G05B 13/02* (2006.01)
*B60W 50/00* (2006.01)

(52) U.S. Cl.
CPC ........ *B60W 60/0027* (2020.02); *B60W 50/00* (2013.01); *B60W 60/0013* (2020.02); *B60W 60/0016* (2020.02); *G05B 13/027* (2013.01); *G05B 13/042* (2013.01); *B60W 2050/0022* (2013.01); *B60W 2510/18* (2013.01); *B60W 2510/20* (2013.01); *B60W 2510/22* (2013.01); *B60W 2520/06* (2013.01); *B60W 2520/10* (2013.01); *B60W 2520/105* (2013.01); *B60W 2520/12* (2013.01); *B60W 2520/125* (2013.01)

(58) Field of Classification Search
None
See application file for complete search history.

(56) References Cited

U.S. PATENT DOCUMENTS

| | | | |
|---|---|---|---|
| 2020/0079369 A1* | 3/2020 | Kuehnle | G06V 10/82 |
| 2023/0119221 A1* | 4/2023 | Ruiz | G06N 3/084 |
| | | | 700/48 |
| 2023/0324856 A1* | 10/2023 | Botero Halblaub | G05B 13/027 |
| | | | 700/47 |

* cited by examiner

*Primary Examiner* — Christian Chace
*Assistant Examiner* — Shayne M. Gilbertson
(74) *Attorney, Agent, or Firm* — Novak Druce Carroll LLP

(57) ABSTRACT

The present technology is directed to dynamically adjusting an autonomous vehicle (AV) system based on deep learning optimizations. An AV management system can generate a downscaling signal based on a result of comparing a complexity of an environment for an AV to navigate with a predetermined complexity threshold. Further, the AV management system can perform a downscaling of a neural network associated with an AV system based on the downscaling signal and determine a scenario to test the downscaled neural network in a simulation. The AV management system can adjust one or more parameters of the AV system based on simulated outputs and perform the simulation of the AV based on the adjusted one or more parameters of the AV system and the downscaled neural network to generate simulated performance data. Furthermore, the AV management system can compare the simulated performance data with a predetermined performance threshold.

20 Claims, 5 Drawing Sheets

# DYNAMIC ADJUSTMENT OF AUTONOMOUS VEHICLE SYSTEM BASED ON DEEP LEARNING OPTIMIZATIONS

TECHNICAL FIELD

The subject matter of this disclosure relates in general to the field of an autonomous vehicle (AV) management system, and more particularly, to solutions for dynamically adjusting an AV system based on deep learning optimizations.

BACKGROUND

Autonomous vehicles (AVs) have computers and control systems that perform driving and navigation tasks that are conventionally performed by a human driver. As AV technologies continue to advance, a real-world simulation for AV testing has been important in improving the safety and efficiency of AV driving. An exemplary AV can include various sensors, such as a camera sensor, a Light Detection and Ranging (LiDAR) sensor, a Radio Detection and Ranging (RADAR) sensor, and software for interpreting data received from the sensors. Collectively these sensors and software can be used to allow an AV to pilot itself.

BRIEF DESCRIPTION OF THE DRAWINGS

Illustrative embodiments of the present application are described in detail below with reference to the following figures.

SUMMARY

Figure 1:
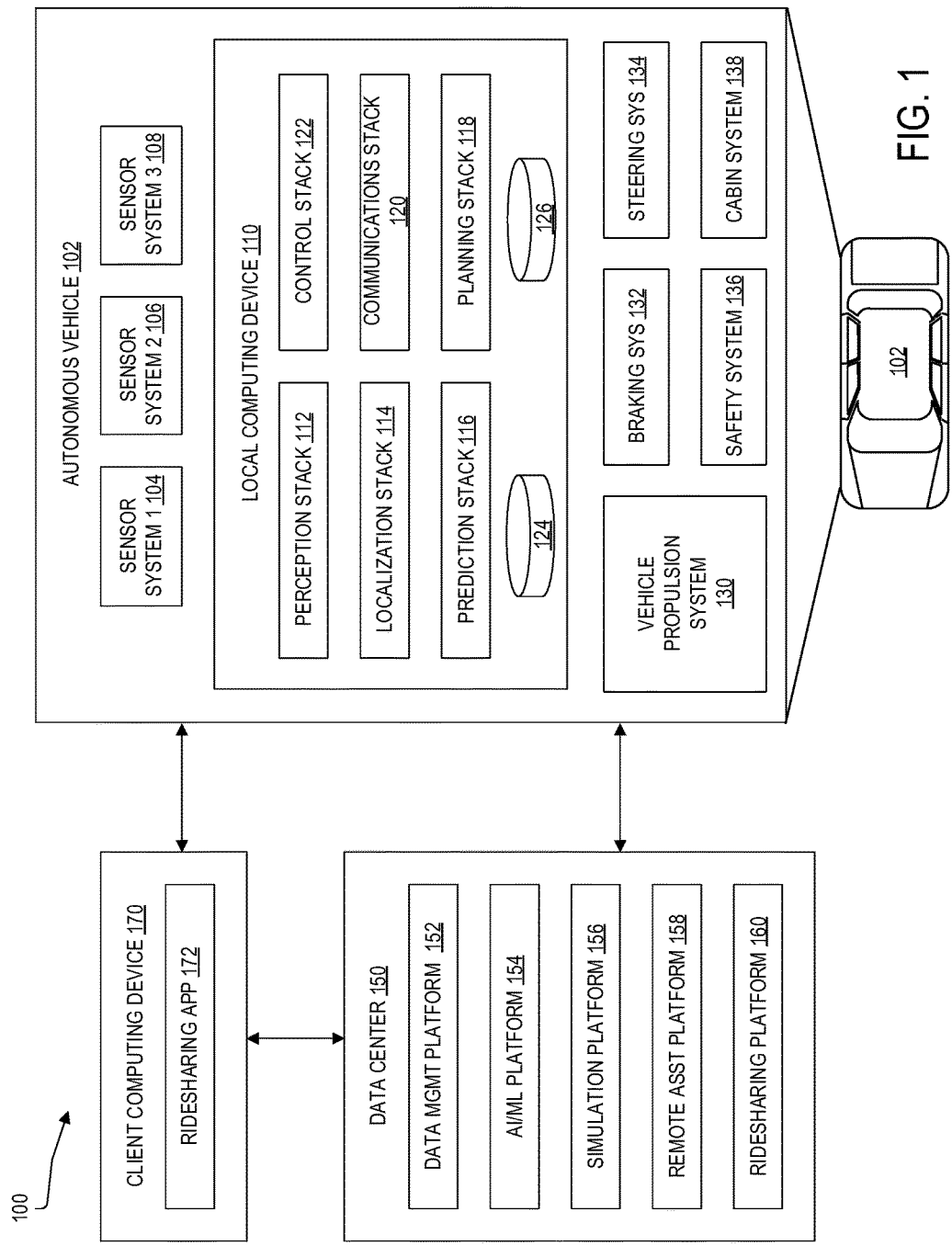
FIG. 1 illustrates an example of a system for managing one or more Autonomous Vehicles (AVs) in accordance with some examples of the present disclosure.

According to at least one example of the present technology, an AV management system can generate a downscaling signal based on a result of comparing a complexity of an environment for an AV to navigate to a predetermined complexity threshold. Further, the AV management system can perform a downscaling of a neural network associated with an AV system based on the downscaling signal and determine a scenario to test the downscaled neural network in a simulation. The AV management system can adjust one or more parameters of the AV system based on simulated outputs and perform the simulation of the AV based on the adjusted one or more parameters of the AV system and the downscaled neural network to generate simulated performance data. Furthermore, the AV management system can compare the simulated performance data with a predetermined performance threshold to generate an acceptance.

Based on the acceptance, the AV management system can initiate or adjust an operation of the AV with the downscaled neural network.

Furthermore, the initiating or adjusting the operation of the AV includes generating environment performance data, and comparing the environment performance data with the predetermined performance threshold. Based on a determination that a value of the environment performance data is lower than the predetermined performance threshold, the AV management system can further downscale the neural network.

Moreover, the downscaling of the neural network can include reducing at least one of a number of layers of the neural network and one or more nodes associated with one or more layers of the neural network. Further, the one or more nodes can be trained during training of the neural network to be modular using a weight sharing technique. The downscaling of the neural network can also include quantizing one or more neural weights and activations of one or more layers of the neural network.

In some examples, the complexity of the environment can be determined based on at least one of a machine learning model, a heuristic model, and a runtime performance matrix. Furthermore, the scenario can include at least one complex simulated environment. The complex simulated environment can comprise one or a combination of obstacles, objects surrounding the AV, traffic, and turns having a threshold directional change.

The one or more parameters of the AV system are associated with at least one of a perception, a tracking, a prediction, a planning, and a localization of the AV. The one or more parameters for the AV system can include at least one of an acceleration, a deceleration, a speed, a braking, a steering, a suspension, a direction, and a path.

The predetermined performance threshold can be based on at least one of a human-level safety value, one or more safety scores, one or more comfort scores, a budget, and a runtime performance value.

A system for dynamically adjusting an AV system based on deep learning optimizations can include one or more processors and at least one computer-readable storage medium storing instructions which, when executed by the one or more processors, cause the one or more processors to generate a downscaling signal based on a result of comparing a complexity of an environment for an AV to navigate with a predetermined complexity threshold, perform a downscaling of a neural network associated with an AV system based on the downscaling signal, determine a scenario to test the downscaled neural network in a simulation, adjust one or more parameters of the AV system based on simulated outputs, perform the simulation of the AV based on the adjusted one or more parameters of the AV system and the downscaled neural network to generate simulated performance data, compare the simulated performance data with a predetermined performance threshold to generate an acceptance, and initiate or adjust an operation of the AV with the downscaled neural network based on the acceptance.

A non-transitory computer-readable storage medium having stored therein instructions which, when executed by one or more processors, can cause the one or more processors to generate a downscaling signal based on a result of comparing a complexity of an environment for an AV to navigate with a predetermined complexity threshold, perform a downscaling of a neural network associated with an AV system based on the downscaling signal, determine a scenario to test the downscaled neural network in a simulation, adjust one or more parameters of the AV system based on simulated outputs, perform the simulation of the AV based on the adjusted one or more parameters of the AV system and the downscaled neural network to generate simulated performance data, compare the simulated performance data with a predetermined performance threshold to generate an acceptance, and initiate or adjust an operation of the AV with the downscaled neural network based on the acceptance.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure.

Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

To enable safe and efficient vehicle automation, AVs utilize a massive amount of data collected from various sensors such as a camera sensor, a LiDAR sensor, a RADAR sensor, and software for interpreting data received from the sensors. A complex high-performance software and breakthroughs in artificial intelligence (AI)/machine learning (ML) algorithms (e.g., deep learning) have been one of the key components to facilitate autonomous driving with a faster, more reliable, safer, energy-efficient system.

While simple environments can benefit from simpler AV software and faster reaction times, more complex environments may need complex AV software and slower reaction times. In order to cater to both needs, two compute paths can be designed. However, such multiple compute paths require additional storage and complexity in the system.

Therefore, there exists a need for an AV management system that enables dynamic adjustment of an AV system based on a complexity of an environment, more specifically based on deep learning optimization without significantly altering functionalities of the system. There is also a strong need for an AV management system that can adjust the sizing of a compute (e.g., downscaling the compute) based on the complexity of an environment. The present technology includes systems, methods, and computer-readable media for solving the foregoing problems and discrepancies, among others. In some examples, systems, methods, and computer-readable media are provided for dynamically adjusting an AV system based on deep learning optimizations.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The bounding area may by defined on grid that can be or include a rectangular, cylindrical, or spherical projection of the camera or LIDAR data.

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point. In some embodiments, the prediction stack 116 can output a probability distribution of likely paths or positions that the object is predicted to take.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be or include a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
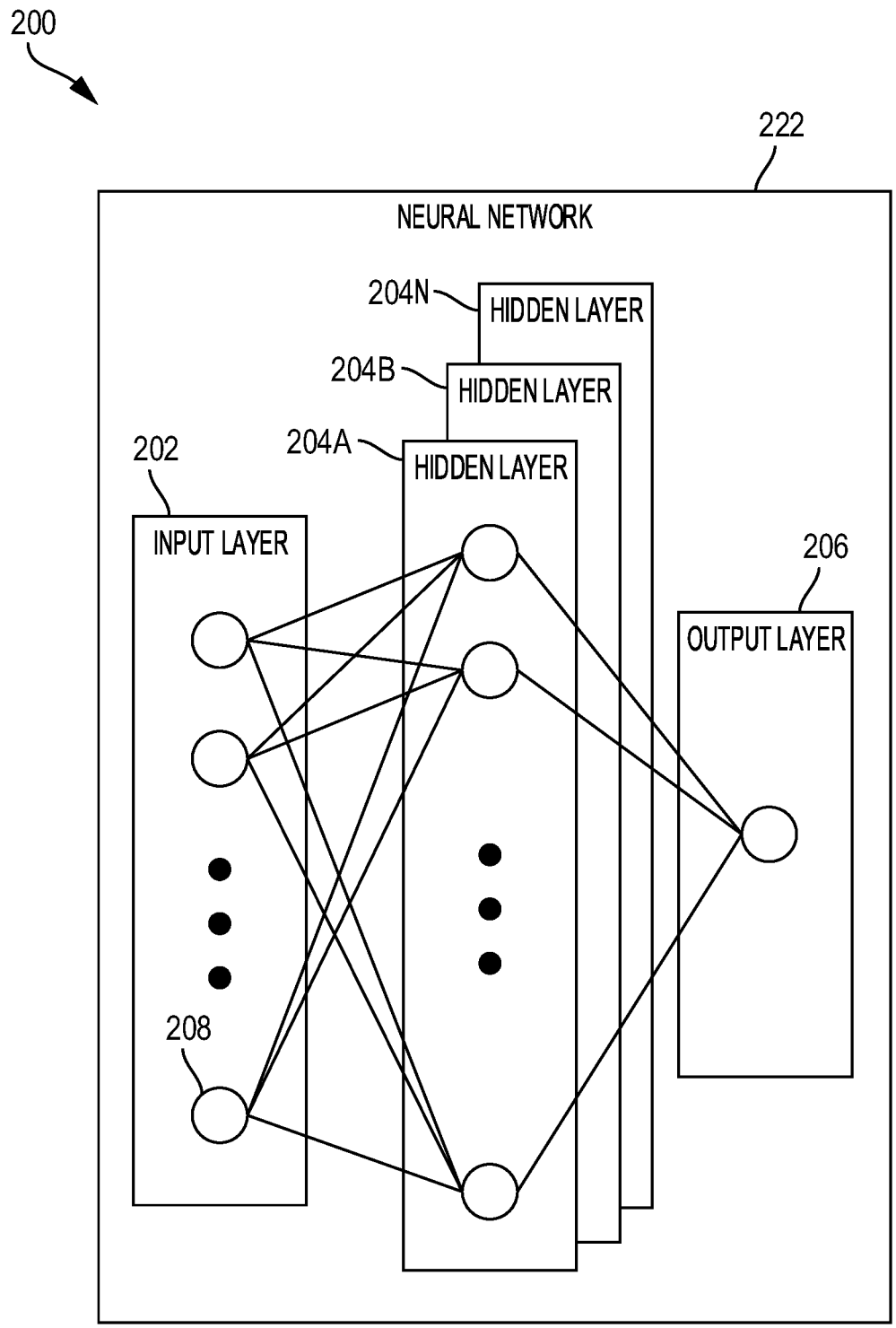
FIG. 2 illustrates an example configuration of a neural network in accordance with some examples of the present disclosure.

FIG. 2 illustrates an example of configuration 200 of the neural network 222. In some cases, neural network 222 can be implemented in software stacks, for example, perception stack 112, localization stack 114, prediction stack 116, planning stack 118, communications stack 120, and/or control stack 122.

The neural network 222 includes an input layer 202, which includes input data. In one illustrative example, the input data at input layer 202 can include sensor data captured by various sensor systems 104, 106, and 108 as illustrated in FIG. 1.

The neural network 222 further includes multiple hidden layers 204A, 204B, through 204N (collectively "204" hereinafter). The neural network 222 can include "N" number of hidden layers (204), where "N" is an integer greater or equal to one. The number of hidden layers can include as many layers as needed for the given application.

The neural network 222 further includes an output layer 206 that provides an output resulting from the processing performed by the hidden layers 204.

The neural network 222 is a multi-layer neural network of interconnected nodes. Each node can represent a piece of information. Information associated with the nodes is shared among the different layers (202, 204, 206) and each layer retains information as it is processed. In some examples, the neural network 222 can be a feed-forward network, in which case there are no feedback connections where outputs of the network are fed back into itself. In other examples cases, the neural network 222 can be a recurrent neural network, which can have loops that allow information to be carried across nodes while reading in the input.

Information can be exchanged between nodes in the layers (202, 204, 206) through node-to-node interconnections between the layers (202, 204, 206). Nodes of the input layer 202 can activate a set of nodes in the first hidden layer 204A. For example, as shown, each of the input nodes of the input layer 202 is connected to each of the nodes of the first hidden layer 204A. The nodes of the hidden layers 204 can transform the information of each input node by applying activation functions to the information. The information derived from the transformation can then be passed to, and activate, the nodes of the next hidden layer 204B, which can perform their own designated functions. Example functions include, without limitation, convolutional, up-sampling, data transformation, and/or any other suitable functions. The output of the hidden layer 204B can then activate nodes of the next hidden layer, and so on. The output of the last hidden layer 204N can activate one or more nodes of the output layer 206, which can then provide an output. In some cases, while nodes (e.g., node 208) in the neural network 222 are shown as having multiple output lines, a node has a single output and all lines shown as being output from a node represent the same output value.

In some cases, each node or interconnection between nodes can have a weight that is a set of parameters derived from a training of the neural network 222. For example, an interconnection between nodes can represent a piece of information learned about the interconnected nodes. The interconnection can have a numeric weight that can be tuned (e.g., based on a training dataset), allowing the neural network 222 to be adaptive to inputs and able to learn as more and more data is processed.

The neural network 222 can be pre-trained to process the features from the data in the input layer 202 using the different hidden layers 204 in order to provide the output through the output layer 206. In an example in which the neural network 222 is used to detect features in an image, the neural network 222 can be trained using training data that includes image data.

The neural network 222 can be further trained as more input data, such as sensor data, is received. In some cases, the neural network 222 can be trained using supervised learning and/or reinforcement training. As the neural network 222 is trained, the neural network 222 can adjust the weights and/or biases of the nodes to optimize its performance.

The neural network 222 can include any suitable neural network. One example includes a convolutional neural network (CNN), which includes an input layer and an output layer, with multiple hidden layers between the input and output layers. The hidden layers of a CNN include a series of convolutional, nonlinear, pooling, fully connected and normalization layers. The neural network 222 can include any other deep network, such as an autoencoder, a deep belief nets (DBNs), a Recurrent Neural Networks (RNNs), among others.

The neural network 222 can be trained in a way where one or more of the nodes 208 can be dropped out without significantly affecting the functionality. The nodes 208 that are dropped out can be selected randomly during training. Alternatively, nodes 208 that are dropped out can be chosen from a pre-determined set of groups (i.e., modular neural network). For example, neural network 222 can be trained in a way that half of the nodes 208 in all layers can be dropped without significantly affecting functionality (called one-shot training with weight sharing in the Deep Learning literature). This can be used to downscale the compute when needed. Neural network 222 can also be trained to be downscaled to one of the multiple pre-selected levels (for example, an option to keep full, half, or one-quarter of nodes 208).

Figure 3:
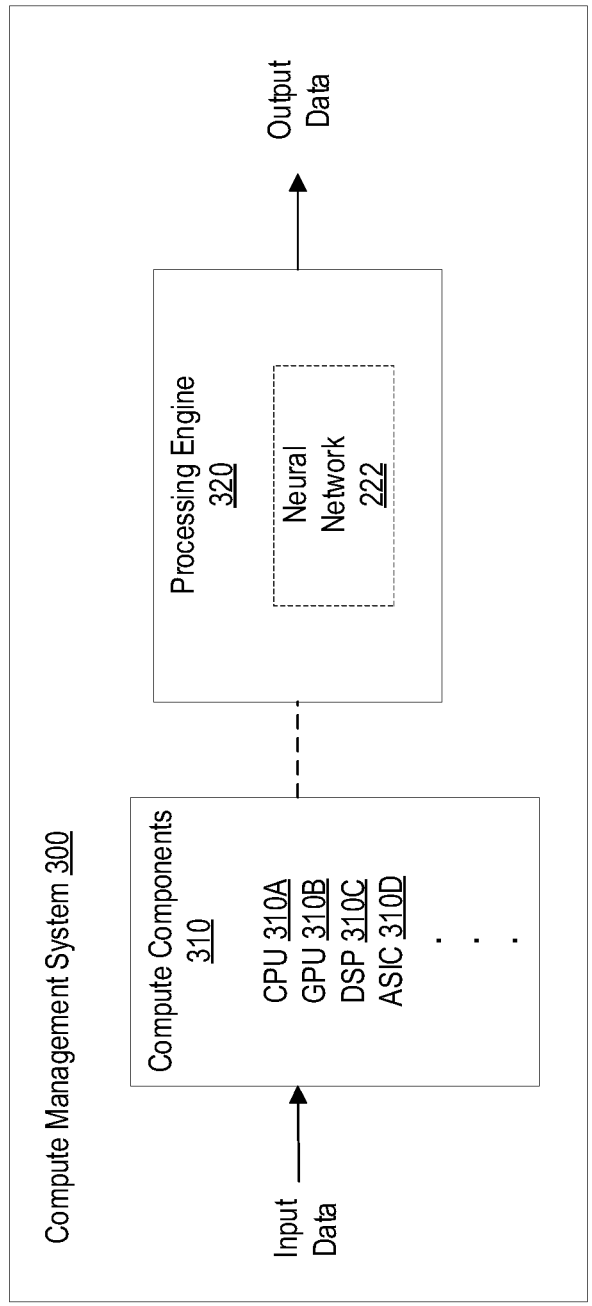
FIG. 3 illustrates an example of a computing device in an AV management system in accordance with some examples of the present disclosure.

FIG. 3 illustrates an example of a compute management system 300 in accordance with some examples of the present disclosure. According to some examples, compute management system 300 can be part of a computing device or multiple devices. In some examples, compute management system 300 is part of local computing device 110 in AV management system 100 as illustrated in FIG. 1.

In the example shown in FIG. 3, compute management system 300 comprises compute components 310, processing engine 320, and neural network 222. However, it should be noted that the example components shown in FIG. 3 are provided for illustrated purposes and can include more or fewer components (and/or different components, for example, as illustrated in FIG. 1) than those shown in FIG. 3.

In some examples, compute management system 300 includes compute components 310 such as a central processing unit (CPU) 310A, a graphics processing unit (GPU) 310B, a digital signal processor (DSP) 310C, an application-specific integrated controller (ASIC) 310D, and/or one or more other processing devices or controllers.

In some instances, compute components 310 can perform various operations by implementing one or more processing engines (e.g., processing engine 320) and/or software services. For example, processing engine 320 can be associated with various software stacks, such as perception stack 112, localization stack 114, prediction stack 116, planning stack 118, communications stack 120, and/or control stack 122 as illustrated in FIG. 1, which can run on compute components 310.

In some examples, compute management system 300 can receive data (e.g., sensor data captured by various sensor systems 104, 106, and 108 as illustrated in FIG. 1) and process the data, for example via neural network 222, to generate output data as shown in FIG. 3.

According to some examples, compute management system 300 can determine the complexity of an environment for an AV to navigate. In some examples, the complexity can be determined based on any applicable machine learning model. In other cases, compute management system 300 can determine the complexity of the environment based on a heuristic model, for example, trial and error.

In some instances, compute management system 300 can determine the complexity of the environment based on runtime performance. For example, the complexity can be determined based on a runtime performance matrix, which maps the runtime performance for various environments based on multiple factors that may indicate the complexity such as traffic, the number of objects surrounding the vehicle, road condition, weather condition, a community type (e.g., urban, suburban, rural), and so on. In other examples, the complexity can be determined based on simulated runtime performance (e.g., an evaluation of the reaction times in a simulation). Determination of complexity may comprise mapping of the simulated runtime performance to an estimated real runtime performance using a mapping function. The mapping function can be adjusted to minimize the difference between estimated real runtime performance and the real runtime performance in the set of environments that an autonomous vehicle (e.g., AV 102 as illustrated in FIG. 1) is expected to operate in.

According to some examples, compute management system 300 can compare the complexity of the environment with a predetermined complexity threshold. In some examples, the predetermined complexity threshold is based on various factors that may slow down the reaction time of processing engine 320 or require longer runtime performance, for example, heavy traffic, a high number of objects surrounding the vehicle, overpopulated area, etc.

According to some examples, compute management system 300 can generate a downscaling signal based on a result of comparing the complexity of the environment for the AV to navigate with the predetermined complexity threshold. Based on the downscaling signal, compute management system 300 can perform a downscaling of the neural network associated with the AV system.

In some examples, if the complexity of the environment is lower than the predetermined complexity threshold, compute management system 300 can determine that the environment is simple and may require less storage and reaction time for processing a given operation. As such, compute management system 300 can downscale neural network 222 for a simpler environment that may require less storage or processing in order to be more efficient and obtain faster reaction time.

In the example of downscaling neural network 222, compute management system 300 can reduce at least one of the layers of neural network 222. As previously described, neural network 222 comprises multiple layers 202, 204, and 206.

In other examples, compute management system 300 can reduce or drop out one or more channels or nodes associated with the layers of neural network 222 (i.e., deep learning pruning). For example, compute management system 300 can reduce the width of the channels associated with the layers of neural network 222 so that the neural network model becomes smaller and more efficient (i.e., taking a less amount of time in training).

In some instances, compute management system 300 can downscale neural network 222 based on one-shot model training where a deep learning model is trained to be a modular neural network, as described before.

In other cases, compute management system 300 can quantize one or more weights and/or activations of the layers of neural network 222 (i.e., deep learning quantization). For example, as neural network 222 is trained, neural network 222 can adjust the weights and/or activations of the nodes to optimize its performance. For example, nodes 208 can be trained during training of neural network 222 to be modular based on a weight sharing technique.

Further, the modification of the weights and activations can be performed based on one of the available Post-Training Quantization (PTQ) methods as described in the literature. PTQ may involve quantizing the weights linearly or non-linearly based on the minimum and maximum values, or a percentile value (e.g., at $1^{st}$ percentile or 99 th percentile of values). Quantization may be performed per input or output channel or node of the Neural Network 222, or per layer. Quantization may also be performed on the activations (e.g., inputs and outputs of nodes 208). Quantization may allow a more computationally efficient lower precision to be used, hence effectively downscaling the compute.

In other examples, compute management system 300 can downscale neural network 222 by reducing the size of inputs or outputs of the neural network 222, or changing some of the parameters of operations of processing engine 320, etc. Examples of parameters may include a neural network layer kernel size, neural network layer padding, neural network axis of operation, etc.

According to some examples, compute management system 300 can determine a scenario to test the downscaled neural network in a simulation, for example, for operability, safety, reliability, efficiency, etc. In some examples, the scenario includes at least one complex environment. For example, the scenario for the simulation can include heavy traffic, severe weather conditions (e.g., strong wind, heavy rain, or lightning), a high number of objects surrounding the vehicle (e.g., vehicles, pedestrians, bikes, or buildings), etc.

According to some examples, compute management system 300 can adjust one or more parameters of an AV system based on simulated outputs. In some examples, simulated outputs can be generated based on training the downscaled neural network in the scenario. For example, compute management system 300 can perform, via processing engine 320, a given operation such as perception, localization, prediction, planning, communications, and tracking with a simulated AV and produce simulated outputs.

Further, compute management system 300 can perform the simulation of AV based on the adjusted one or more parameters (i.e., operational parameters such as direction, steering, acceleration, path, and speed) of the AV system to generate simulated performance data. In some examples, the simulated performance data is associated with latency violations, safe stops, safety scores, and/or comfort scores.

According to some examples, compute management system 300 can compare the simulated performance data with a reference (i.e., a predetermined performance threshold). The predetermined performance threshold can be based on a human-level safety value, one or more safety scores, one or more comfort scores, a budget, and a runtime performance value. For example, compute management system 300 can determine if the downscaling of neural network 222 improves the system performance without affecting the functionality, reliability, safety, comfort, and/or efficiency of the system.

In some examples, compute management system 300 can generate an acceptance based on a result of the comparison between the simulated performance data and the reference (i.e., a predetermined performance threshold). Further, compute management system 300 can initiate or adjust an operation of the AV with the downscaled neural network based on the acceptance.

In some examples, for the comparison between the simulated performance data and the reference, compute management system 300 can convert the simulated performance data into a value (e.g., a performance reflected in the data).

If compute management system 300 determines that the simulated performance data does not satisfy the predetermined performance threshold, compute management system 300 can adjust or modify the downscaling of neural network 222 and follow the subsequent steps. For example, compute management system 300 can downscale neural network 222 more or less aggressively (e.g., pruning more layers of neural network 222 or quantizing more weights and/or activations of layers of neural network 222, etc.). In other cases, compute management system 300 can downscale neural network 222 in more or less deep learning models. In some instances, compute management system 300 can iterate to meet the budget.

According to some examples, if compute management system 300 determines that the AV is in the environment (e.g., the AV physically arrives in the environment to navigate), similar to the steps previously described with respect to the simulation, compute management system 300 can adjust the one or more parameters of the AV system based on environment outputs, perform navigation of the AV in the environment to generate environment performance data, and compare the environment performance data with the predetermined performance threshold. If a value of the environment performance data is lower than the predetermined performance threshold, compute management system 300 can modify the downscaling of neural network 222.

Figure 4:
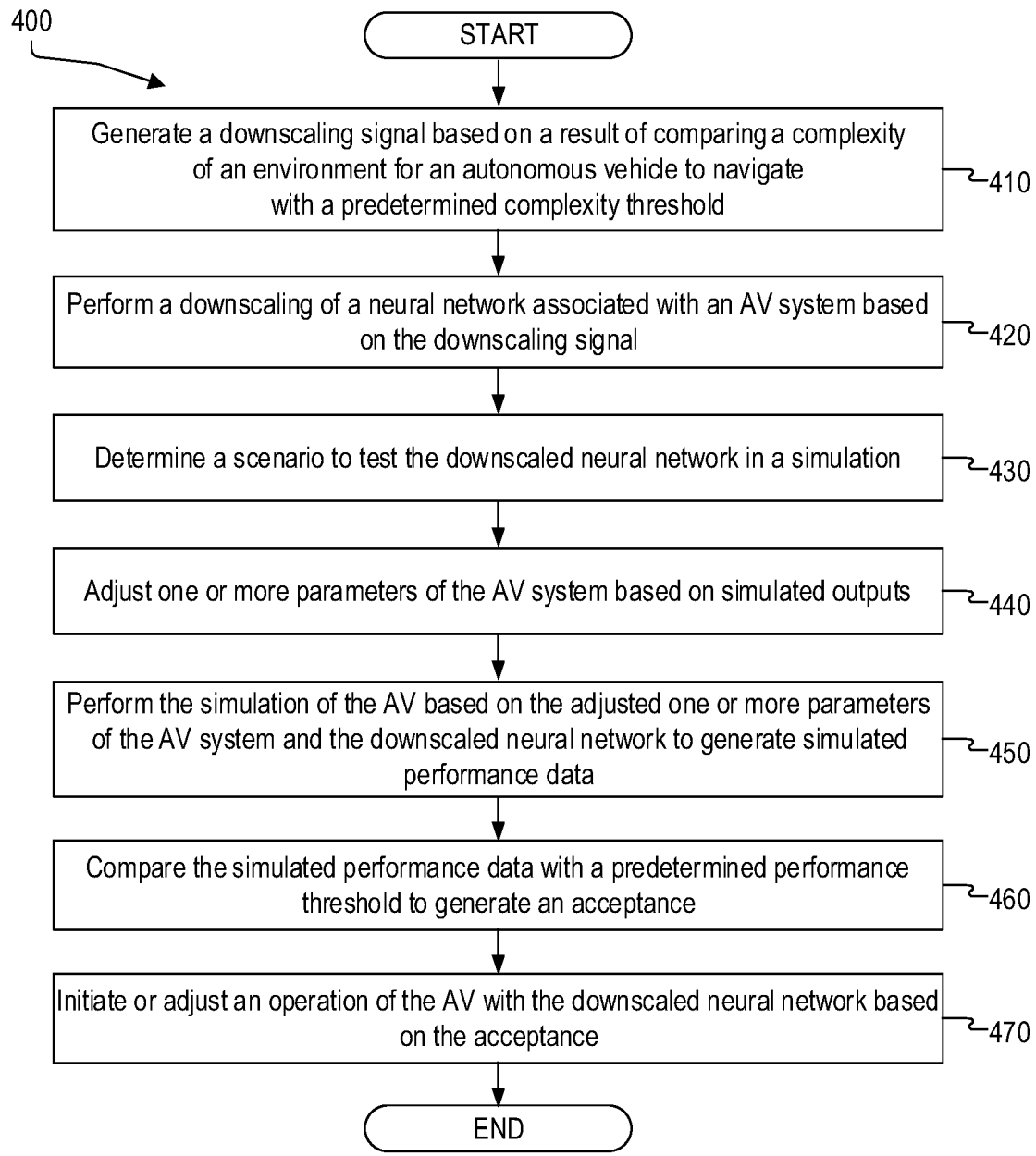
FIG. 4 illustrates a flowchart of a method for dynamically adjusting an AV system based on deep learning optimizations in accordance with some examples of the present disclosure.

FIG. 4 is a flowchart of an example method 400 for dynamically adjusting an autonomous vehicle (AV) system based on deep learning optimizations according to some aspects of the disclosed technology. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements the method 400 may perform functions at substantially the same time or in a specific sequence.

According to some examples, at step 410, AV management system generates a downscaling signal based on a result of comparing a complexity of an environment for an AV (e.g., AV 102 as illustrated in FIG. 1) to navigate with a predetermined complexity threshold. For example, compute management system 300 as illustrated in FIG. 3 can generate a downscaling signal based on a result of comparing the complexity of an environment for AV 102 to navigate with a predetermined complexity threshold. In some examples, compute management system 300 as illustrated in FIG. 3 can determine if the complexity of an environment for AV 102 to navigate is equal to or higher or lower than a predetermined complexity threshold.

In some examples, the complexity of the environment can be determined based on a machine learning model, a heuristic model, and/or a runtime performance matrix. Examples of factors that may be used in determining the complexity include, but are not limited to, traffic, the number of objects surrounding the AV, road condition, weather condition, a community type (e.g., urban, suburban, rural), population, and lighting condition.

In some examples, complexity may be an integer-valued or real-valued numerical value. The integer-valued or real-valued numerical value can be calculated by summing over the complexity of individual factors. The complexity of each factor can be calculated by mapping each value of the factor to a number. For example, a number of objects can be directly mapped to complexity (e.g., 10 objects map to a complexity value of 10). In another example, rainy weather can map to a complexity value of 10 while sunny weather can map to complexity of 0. The complexity of each factor can be determined in proportion to how much each factor affects runtime performance.

If the complexity of the environment for the AV to navigate does not satisfy the predetermined complexity threshold, AV management system does not proceed to the downscaling of the neural network due to a large amount of input data associated with the complex environment that needs to be processed.

On the other hand, if the complexity of the environment for the AV satisfies the predetermined complexity threshold, AV management system can generate a downscaling signal.

According to some examples, AV management system performs a downscaling of a neural network associated with an AV system based on the downscaling signal at step 420. For example, compute management system 300 as illustrated in FIG. 3 can perform the downscaling of neural network 222 as illustrated in FIG. 2 based on the downscaling signal.

In some examples, the downscaling of the neural network can include reducing at least one of a number of layers of the neural network. For example, compute management system 300 as illustrated in FIG. 3 can reduce at least one of a number of layers (e.g., multiple layers 202, 204, and 206) of neural network 222 as illustrated in FIG. 2 to reduce the amount of time in training and further improve the runtime performance. In some instances, the downscaling of the neural network can include reducing one or more nodes 208 associated with one or more layers of the neural network. Downscaling of the neural network 222 can be based on one-shot pruning with weight sharing, where the neural network 222 can be trained to be modular, and the downscaling is performed in accordance with the modularity of the neural network 222. For example, nodes 208 can be trained during training of neural network 222 to be modular using a weight sharing technique.

In some examples, the downscaling of the neural network can include quantizing one or more neural weights and/or activations of one or more layers of the neural network. For example, compute management system 300 as illustrated in FIG. 3 can quantize one or more neural weights, inputs and outputs of nodes (e.g., node 208) associated with one or more layers (e.g., multiple layers 202, 204, and 206) of neural network 222 as illustrated in FIG. 2 to optimize the deep learning model. Quantization can increase the throughput of computation and effectively downscale the compute of the neural network.

According to some examples, at step 430, AV management system can determine a scenario to test the downscaled neural network in a simulation. This test can be used to determine the safety, operability, reliability, the efficiency of the compute (e.g., compute components 310, processing engine 320, neural network 222, and various software stacks such as perception stack 112, localization stack 114, prediction stack 116, planning stack 118, communications stack 120, and control stack 122 as illustrated in FIGS. 1 and 3). For example, compute management system 300 can determine a scenario to test the downscaled neural network 222 in a simulation.

In some examples, the scenario can include at least one complex simulated environment. The complex simulated environment can comprise one or a combination of obstacles, objects surrounding the autonomous vehicle, traffic, and turns having a threshold directional change. The complex simulated environment can be chosen based on a typical/ordinary or difficult/complicated environment that AV 102 is expected to be operated in.

According to some examples, at step 440, AV management system can adjust one or more parameters of the AV system (e.g., operational parameters) based on simulated outputs. In some examples, the one or more parameters of the AV system are associated with at least one of perception, tracking, prediction, planning, and localization of the autonomous vehicle. For example, compute management system 300 as illustrated in FIG. 3 can adjust one or more operational parameters associated with operations performed by processing engine 320 or software stacks (e.g., various software stacks as illustrated in FIG. 1) such as perception, localization, prediction, planning, communications, control, and/or tracking.

In some instances, examples of the one or more parameters for the autonomous vehicle include, but are not limited to, an acceleration, a deceleration, a speed, braking, steering, a suspension, a direction, and a path.

According to some examples, at step 450, AV management system can perform the simulation of the AV based on the adjusted one or more parameters of the AV system and the downscaled neural network to generate simulated performance data. For example, compute management system 300 as illustrated in FIG. 3 can perform the simulation of AV 102 in FIG. 1 based on the adjusted one or more parameters of the AV system and the downscaled neural network 222 as illustrated in FIG. 2 to generate simulated performance data.

According to some examples, at step 460, AV management system can compare the simulated performance data with a predetermined performance threshold to generate an acceptance. For example, compute management system 300 can compare the simulated performance data and the predetermined performance threshold to generate an acceptance. In some examples, the predetermined performance threshold is based on at least one of a human-level safety value, one or more safety scores, one or more comfort scores, a budget, and a runtime performance value.

In some instances, AV management system can analyze the simulated performance data and convert it to a value (e.g., numeric value, ratings, grade, etc.) for the comparison against the predetermined performance threshold.

According to some examples, AV management system can determine if a value of the simulated performance data satisfies the predetermined performance threshold.

If the value of the simulated performance data satisfies the predetermined performance threshold, AV management system can determine that the downscaled neural network is acceptable and satisfies the standards for safety, operability, reliability, and/or efficiency (e.g., improvement in the runtime performance). For example, processing engine 320 and/or various software stacks can run on compute components 310 based on the downscaled neural network 222. Accordingly, at step 470, AV management system initiates or adjusts an operation of the AV with the downscaled neural network based on the acceptance. For example, compute management system 300 can initiate or adjust an operation of AV 102 with the downscaled neural network 222 based on the acceptance.

If AV management system determines that the value of the simulated performance data does not satisfy the predetermined performance threshold, AV management system can further downscale the neural network. For example, if compute management system 300 determines that the downscaled neural network 222 cannot be trained within any predetermined performance standards or limits, compute management system 300 can further downscale neural network 222, for example, calibrate the runtime down or up, or perform one-off tweaking.

According to some examples, method 400 further includes determining, by AV management system, that the AV is in the environment. For example, compute management system 300 as illustrated in FIG. 3 can determine that AV 102 illustrated in FIG. 1 arrives in the environment to navigate.

In some examples, AV management system can adjust the one or more parameters of the AV system based on environment outputs. For example, compute management system 300 can adjust the one or more operational parameters of the AV system based on environment outputs, which are generated by training the downscaled neural network in the environment. As previously described, examples of the one or more parameters include, but are not limited to, acceleration, deceleration, speed, braking, steering, suspensions, direction, and/or path, which are associated with operations of processors (e.g., processing engine 320) and/or software services (e.g., various software stacks as illustrated in FIG. 1).

According to some examples, AV management system can perform navigation of the AV in the environment to generate environment performance data. For example, compute management system 300 can perform navigation of AV 102 in the environment to generate environment performance data based on the adjusted one or more parameters.

According to some examples, AV management system can compare the environment performance data with the predetermined performance threshold. For example, compute management system 300 can compare the environment performance data against the predetermined performance threshold, which is previously illustrated with respect to steps 450 and 460. Also, for the comparison, compute management system 300 can interpret the environment performance data and convert it to a comparable value (e.g., numeric value, ratings, grade, etc.).

If AV management system determines that the value of the environment performance data is not lower than the predetermined performance threshold, AV management system can determine that the downscaled neural network can be trained safely and efficiently.

On the other hand, if a value of the environment performance data is lower than the predetermined performance threshold, AV management system determines that the downscaled neural work does not improve the runtime performance and can further downscale the neural network.

Figure 5:
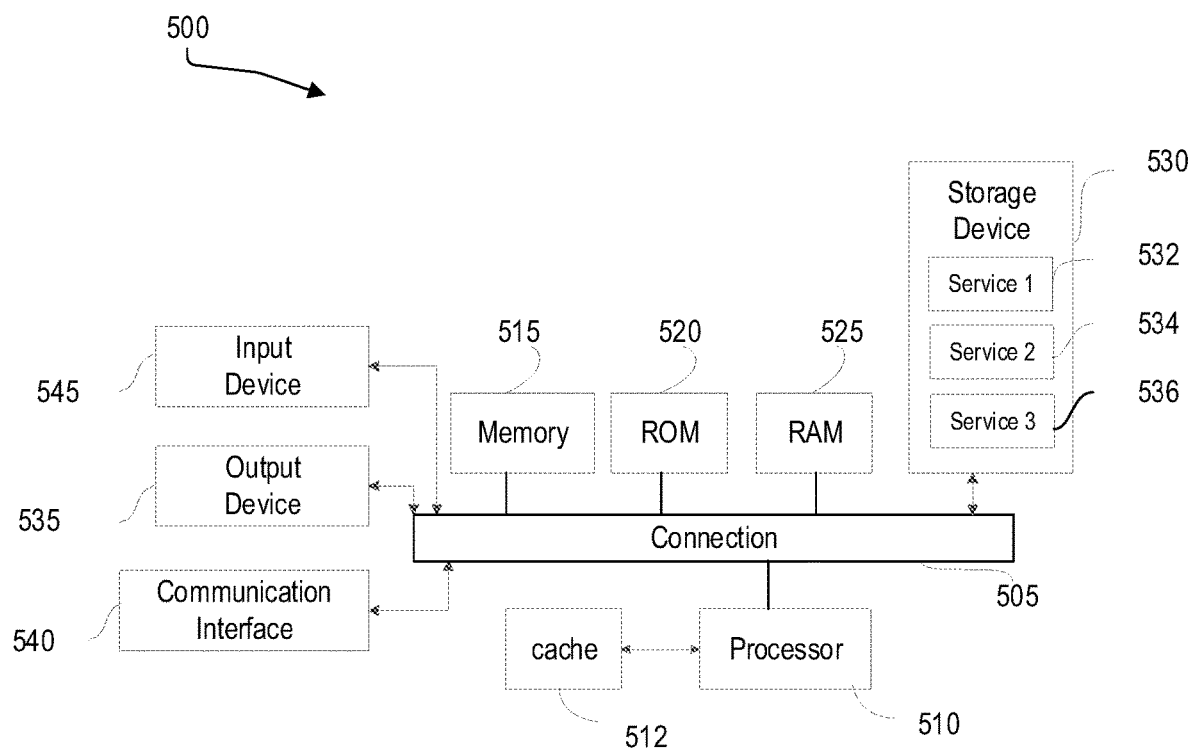
FIG. 5 illustrates an example network device, in accordance with some examples of the present disclosure.

FIG. 5 shows an example of computing system 500, which can be for example any computing device making up AV management system 100 or compute management system 300, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The invention claimed is:

1. A method comprising:
generating a downscaling signal based on a result of comparing a complexity of an environment for an autonomous vehicle to navigate with a predetermined complexity threshold;
performing a downscaling of a neural network associated with an autonomous vehicle system based on the downscaling signal;
determining a scenario to test the downscaled neural network in a simulation;
adjusting one or more parameters of the autonomous vehicle system based on simulated outputs;
performing the simulation of the autonomous vehicle based on the adjusted one or more parameters of the autonomous vehicle system and the downscaled neural network to generate simulated performance data;
comparing the simulated performance data with a predetermined performance threshold to generate an acceptance; and
initiating or adjusting an operation of the autonomous vehicle with the downscaled neural network based on the acceptance.

2. The method of claim 1, wherein the initiating or adjusting the operation of the autonomous vehicle comprises:
generating environment performance data;
comparing the environment performance data with the predetermined performance threshold; and
based on a determination that a value of the environment performance data is lower than the predetermined performance threshold, further downscaling the neural network.

3. The method of claim 1, further comprising:
based on a determination that a value of the simulated performance data is lower than the predetermined performance threshold, further downscaling the neural network.

4. The method of claim 1, wherein the downscaling of the neural network includes:
reducing at least one of a number of layers of the neural network and one or more nodes associated with one or more layers of the neural network.

5. The method of claim 4, wherein the one or more nodes are trained during training of the neural network to be modular using a weight sharing technique.

6. The method of claim 1, wherein the downscaling of the neural network includes:
quantizing one or more neural weights and activations of one or more layers of the neural network.

7. The method of claim 1, wherein the complexity of the environment is determined based on at least one of a machine learning model, a heuristic model, and a runtime performance matrix.

8. The method of claim 1, wherein the scenario includes at least one complex simulated environment, the at least one complex simulated environment comprising one or a combination of obstacles, objects surrounding the autonomous vehicle, traffic, and turns having a threshold directional change.

9. The method of claim 1, wherein the one or more parameters of the autonomous vehicle system are associated with at least one of a perception, a tracking, a prediction, a planning, and a localization of the autonomous vehicle.

10. The method of claim 1, wherein the one or more parameters for the autonomous vehicle system include at least one of an acceleration, a deceleration, a speed, a braking, a steering, a suspension, a direction, and a path.

11. The method of claim 1, wherein the predetermined performance threshold is based on at least one of a human-level safety value, one or more safety scores, one or more comfort scores, a budget, and a runtime performance value.

12. A system comprising:
one or more processors; and
a computer-readable medium comprising instructions stored therein, which when executed by the one or more processors, cause the one or more processors to:
generate a downscaling signal based on a result of comparing a complexity of an environment for an autonomous vehicle to navigate with a predetermined complexity threshold;
perform a downscaling of a neural network associated with an autonomous vehicle system based on the downscaling signal;
determine a scenario to test the downscaled neural network in a simulation;
adjust one or more parameters of the autonomous vehicle system based on simulated outputs;
perform the simulation of the autonomous vehicle based on the adjusted one or more parameters of the autonomous vehicle system and the downscaled neural network to generate simulated performance data;
compare the simulated performance data with a predetermined performance threshold to generate an acceptance; and
initiate or adjust an operation of the autonomous vehicle with the downscaled neural network based on the acceptance.

13. The system of claim 12, wherein the instructions to initiate or adjust the operation of the autonomous vehicle comprise the instructions to:
generate environment performance data;
compare the environment performance data with the predetermined performance threshold; and
based on a determination that a value of the environment performance data is lower than the predetermined performance threshold, further downscale the neural network.

14. The system of claim 12, wherein the instructions, which when executed by the one or more processors, further cause the one or more processors to:
based on a determination that a value of the simulated performance data is lower than the predetermined performance threshold, further downscaling the neural network.

15. The system of claim 12, wherein the downscaling of the neural network includes:
reducing at least one of a number of layers of the neural network and one or more nodes associated with one or more layers of the neural network.

16. The system of claim 15, wherein the one or more nodes are trained during training of the neural network to be modular using a weight sharing technique.

17. A non-transitory computer-readable storage medium comprising computer-readable instructions, which when executed by a computing system, cause the computing system to:
generate a downscaling signal based on a result of comparing a complexity of an environment for an autonomous vehicle to navigate with a predetermined complexity threshold;
perform a downscaling of a neural network associated with an autonomous vehicle system based on the downscaling signal;
determine a scenario to test the downscaled neural network in a simulation;
adjust one or more parameters of the autonomous vehicle system based on simulated outputs;
perform the simulation of the autonomous vehicle based on the adjusted one or more parameters of the autonomous vehicle system and the downscaled neural network to generate simulated performance data;
compare the simulated performance data with a predetermined performance threshold to generate an acceptance; and
initiate or adjust an operation of the autonomous vehicle with the downscaled neural network based on the acceptance.

18. The non-transitory computer-readable storage medium of claim 17, wherein the instructions to initiate or adjust the operation of the autonomous vehicle comprise the instructions to:
generate environment performance data;
compare the environment performance data with the predetermined performance threshold; and
based on a determination that a value of the environment performance data is lower than the predetermined performance threshold, further downscale the neural network.

19. The non-transitory computer-readable storage medium of claim 17, wherein the instructions, which when executed by the computing system, further cause the computing system to:
based on a determination that a value of the simulated performance data is lower than the predetermined performance threshold, further downscaling the neural network.

20. The non-transitory computer-readable storage medium of claim 17, wherein the downscaling of the neural network includes:
reducing at least one of a number of layers of the neural network and one or more nodes associated with one or more layers of the neural network.

* * * * *